United States Patent [19]
Wingate

[11] Patent Number: 6,006,115
[45] Date of Patent: Dec. 21, 1999

[54] WIRELESS HEADPHONES FOR ENTERTAINMENT AND TELEPHONIC COMMUNICATION

[75] Inventor: Richard C. Wingate, Scarsdale, N.Y.

[73] Assignees: Sony Corporation, Tokyo, Japan; Sony Electronics, Inc., Park Ridge, N.J.

[21] Appl. No.: 08/950,833

[22] Filed: Oct. 15, 1997

[51] Int. Cl.⁶ ............................. H04B 1/38; H04M 1/00
[52] U.S. Cl. ................ 455/568; 455/569; 455/563; 279/110.1; 279/420; 279/430
[58] Field of Search ................ 379/88.03, 110.1, 379/420, 430; 455/563, 568, 564, 569, 575, 90; 381/74, 311, 375

[56] References Cited

U.S. PATENT DOCUMENTS

| | | | |
|---|---|---|---|
| 4,653,087 | 3/1987 | Galich | 379/110.1 |
| 4,907,266 | 3/1990 | Chen | 379/430 |
| 4,928,302 | 5/1990 | Kaneuchi et al. | 379/88.03 |
| 5,694,497 | 12/1997 | Young, III | 379/430 |

*Primary Examiner*—Paul Loomis
*Attorney, Agent, or Firm*—Ronlad P. Kananen; Rader, Fishman & Grauer

[57] ABSTRACT

A pair of wireless headphones receives radio frequency transmissions from a sound system to provide music and other audio programming to a user who is free to move anywhere within the range of the transmissions. A telephone base unit also broadcasts notification of incoming phone calls to the wireless headphones. The headphones may provide an audio signal over or instead of the audio programming to notify the user of the incoming call. The headphones may also incorporate a microphone so that the user can receive the phone call with the headphones.

24 Claims, 4 Drawing Sheets

WIRELESS HEADPHONES FOR ENTERTAINMENT AND TELEPHONIC COMMUNICATION

FIELD OF THE INVENTION

The present invention relates to the fields of electronic audio entertainment and telephony. More particularly, the present invention relates to wireless headphones for providing entertainment in an audio format and telephonic communications.

BACKGROUND OF THE INVENTION

Cordless telephones have become extremely popular in modern society. A cordless telephone operates by transmitting a radio frequency signal between a base unit, which is connected to a standard public phone line, and a handset which can be located anywhere within a certain radius of the base unit. The handset typically incorporates a telephone key pad and a ringer so that, from the handset, a user can make and receive telephone calls. A handset may also incorporate other buttons or features to allow the user to, for example, talk to the base unit, retrieve messages from an answering machine and deactivate the handset for privacy.

The great advantage of a cordless phone is its ability to provide the user with telephonic communication at any point sufficiently close to the base unit. In this way, a user may have the handset convenient while in the bathroom, in bed, or in the yard. The user may, if necessary, move from one location to another during a phone call to retrieve information, perform a chore or check on a situation being monitored. If the user is working from a home office, the user can move about the house as desired with the cordless phone and not miss important business calls.

Another benefit enjoyed by modern society is the wide and ready availability of music and other audio programming. With such electronic devices as radios, cassette tape players and compact disc players, a user may listen to virtually any music or other audio programming desired. Moreover, with the advent of headphones and personal portable stereo units, users have gained advantages similar to those offered by cordless phones in that the music or audio programming desired may be played and listened to in almost any location or setting, or while traveling.

However, due to the constraints on size, portable personal stereo units are unable to duplicate the quality and versatility of larger home stereo units. For example, in addition to extremely high fidelity, home stereo systems may incorporate compact disc changers which allow the user to insert a number of compact discs, ten for example, and create a program where one or more songs will be played from each of the compact discs in an order desired by the user. Such versatility is, for obvious reasons, not typically available from portable personal stereo units.

Accordingly, it would be convenient to combine the portability of a personal stereo with the fidelity and versatility of a home stereo system. To address this need, wireless headphones used with a home stereo system have been developed.

Similar to a cordless telephone, the wireless headphones receive a radio frequency transmission from the personal stereo of music or other audio programming. The user wearing the headphones can then travel throughout the house or even work in the yard while listening to the home stereo unit. In such an instance the use of wireless headphones may be advantageous not only for portability, but also to prevent others in the house, or in an apartment building, in neighboring apartments from being disturbed by the home stereo unit.

A problem with the use of such wireless headphones may arise if the user needs or wishes to receive a telephone call. If the phone rings while the user is listening to music or other audio programming with headphones, the user may not be able to hear the phone and may consequently miss the phone call. Accordingly, there is a need in the art for method and apparatus for providing portable audio programming for the listening enjoyment of a user while preventing the user from missing telephone calls.

SUMMARY OF THE INVENTION

Accordingly, it is an object of the present invention to meet the above described need and others. Particularly, it is an object of the present invention to provide a method and apparatus for providing portable audio programming for the listening enjoyment of a user while preventing the user from missing telephone calls.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve the stated and other objects of the present invention, as embodied and described below, the invention may comprise an apparatus for providing portable audio programming for the listening enjoyment of a user while preventing the user from missing telephone calls. The apparatus may include headphones and a circuit on the headphones which receives wireless transmissions from both a phone base unit and an audio system. The circuit alerts a user of the headphones when a transmission received from the phone base unit indicates an incoming phone call.

The apparatus of the present invention may also include a microphone on the headphones. The circuit can then transduce verbal utterances of the user with the microphone and transmit the utterances to the phone base unit to conduct a telephone call. A switch for activating and deactivating the microphone may also be provided. The microphone may be disposed directly on the headphones or may be located on an extension which can be extended from and retracted into the headphones. The extension brings the microphone closer to the mouth of the wearer of the headphones to facilitate the phone conversation. A switch may be provided which automatically activates the microphone upon extending of the extension and automatically deactivates the microphone upon retraction of the extension.

If the switch is actuated to activate the microphone following an alert that a phone call is incoming, the circuit opens a line through the telephone base unit over which the incoming telephone call is conducted. If the switch is actuated to activate the microphone without the circuit having received an indication of an incoming telephone call, the circuit will open a line through the telephone base unit for initiating a telephone call.

For initiating a call, the circuit may comprise a voice recognition system which recognizes the name of a party to be called uttered by the user and initiates a telephone call over the open line to the party. Alternatively, the voice recognition system may be located at the telephone base unit.

The circuit of the present invention may also include a switch for disabling the circuit from alerting the user of a transmission received from the phone base unit indicating an incoming phone call when the user wishes privacy. The headphones may also have a light source for facilitating work or reading in low ambient light conditions.

The present invention also encompasses a method for providing portable audio programming for the listening enjoyment of a user while preventing the user from missing telephone calls by: providing headphones; providing a circuit with the headphones which receives wireless transmissions from both a phone base unit and an audio system; and with the circuit, alerting a user of the headphones when a transmission received from the phone base unit indicates an incoming phone call.

The method of the present invention may continue with transducing verbal utterances of the user with a microphone provided with the headphones; and transmitting the utterances to the phone base unit to conduct a telephone call. The method may also include activating and deactivating the microphone with a switch, and providing the microphone on an extension which can be extended from and retracted into the headphones. If the extension is employed, the method may include automatically activating the microphone upon extending of the extension and automatically deactivating the microphone upon retraction of the extension.

If the switch is actuated to activate the microphone following the alert, the method may include opening a line through the telephone base unit, with the circuit to receive an incoming call; and answering the incoming telephone call over the opened line. If the switch is actuated to activate the microphone without the circuit having received an indication of an incoming telephone call, the method may include opening a line through the telephone base unit with the circuit for initiating a telephone call.

When initiating a call, the method of the present invention includes recognizing the name of party to be called uttered by the user with a voice recognition system provided as part of the circuit; and initiating a telephone call over the open line to that party. Alternatively, the voice recognition system may be located at the telephone base unit.

As additional convenient features, the method of the present invention may include disabling the circuit from alerting the user of a transmission received from the phone base unit indicating an incoming phone call with a switch provided with the headphones, and providing a light source on the headphones for work or reading in low ambient light.

BRIEF DESCRIPTION OF THE DRAWINGS

The accompanying drawings illustrate the present invention and are a part of the specification. Together with the following description, the drawings demonstrate and explain the principles of the present invention. In the drawings.

DETAILED DESCRIPTION OF THE PREFERRED EMBODIMENT

Using the drawings, the preferred embodiment of the present invention will now be explained.

Figure 1:
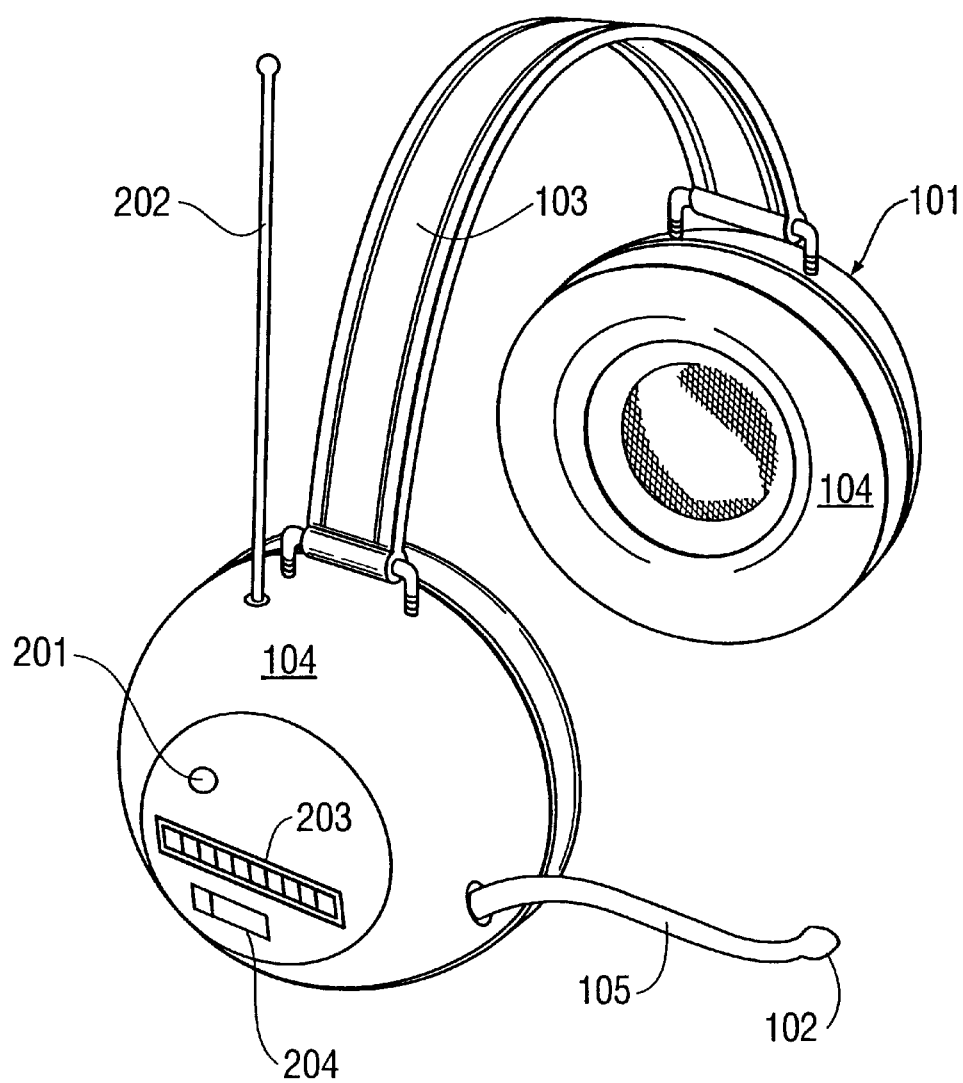
FIG. 1 is an illustration of an apparatus of the present invention for providing portable audio programming for the listening enjoyment of a user while preventing the user from missing telephone calls.

As illustrated in FIG. 1, the present invention may be embodied in a set of wireless headphones 101. Like most headphones, the wireless headphones 101 of the present invention include two speakers 104 which are attached to each other by a band 103. The band 103 is worn over the top of the user's head so that the speakers 104 are held over the ears. The use of two independent speakers 104 allows the audio programming to be provided in stereo.

The headphones 101 also include an antenna 202 for receiving radio frequency transmissions from a home stereo or base unit (not shown). The transmissions are transduced by the speakers 104 to provide music or other audio programming to the ears of the user.

Figure 3:
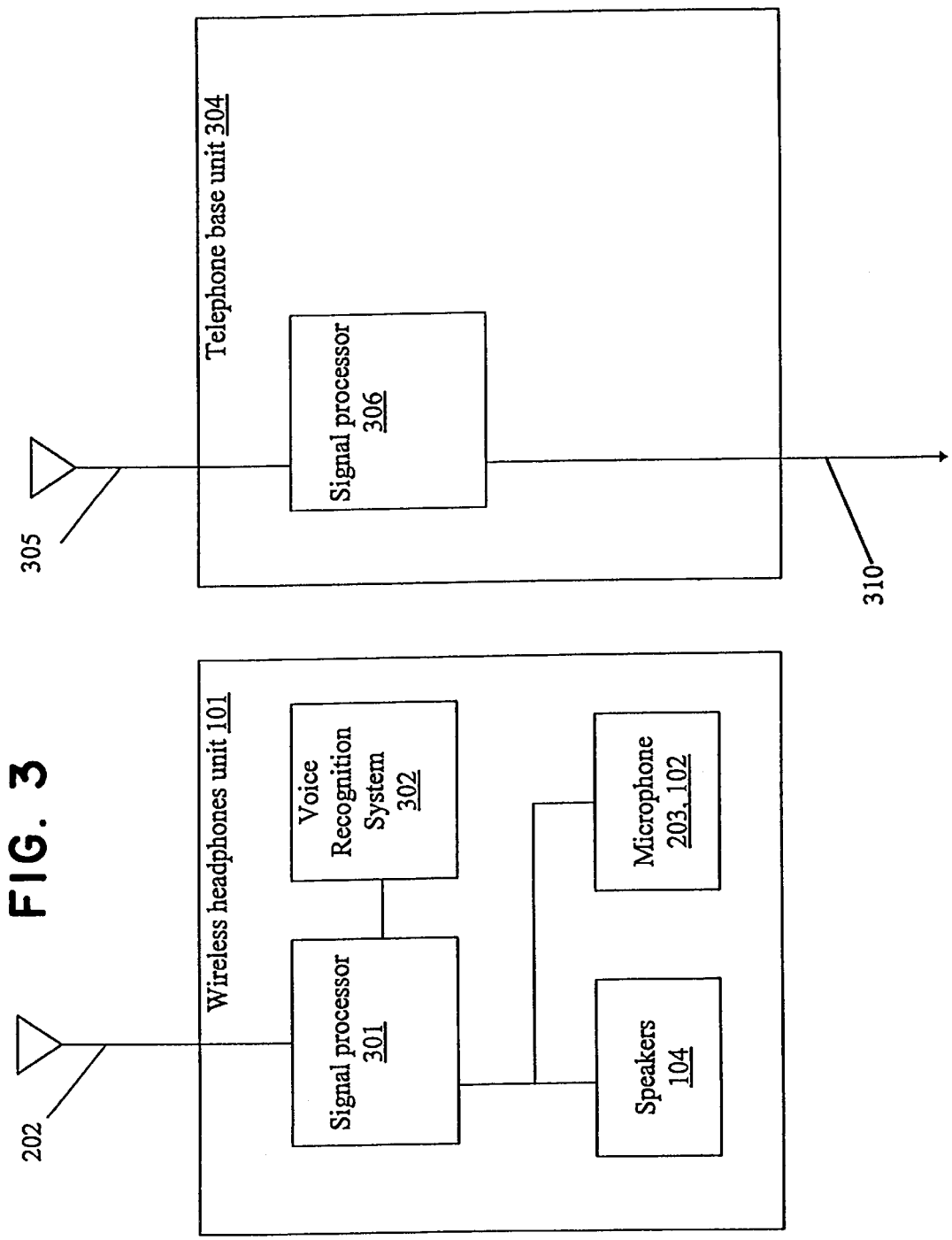
FIG. 3 is a block diagram for explaining a third embodiment of the present invention.
Figure 4:
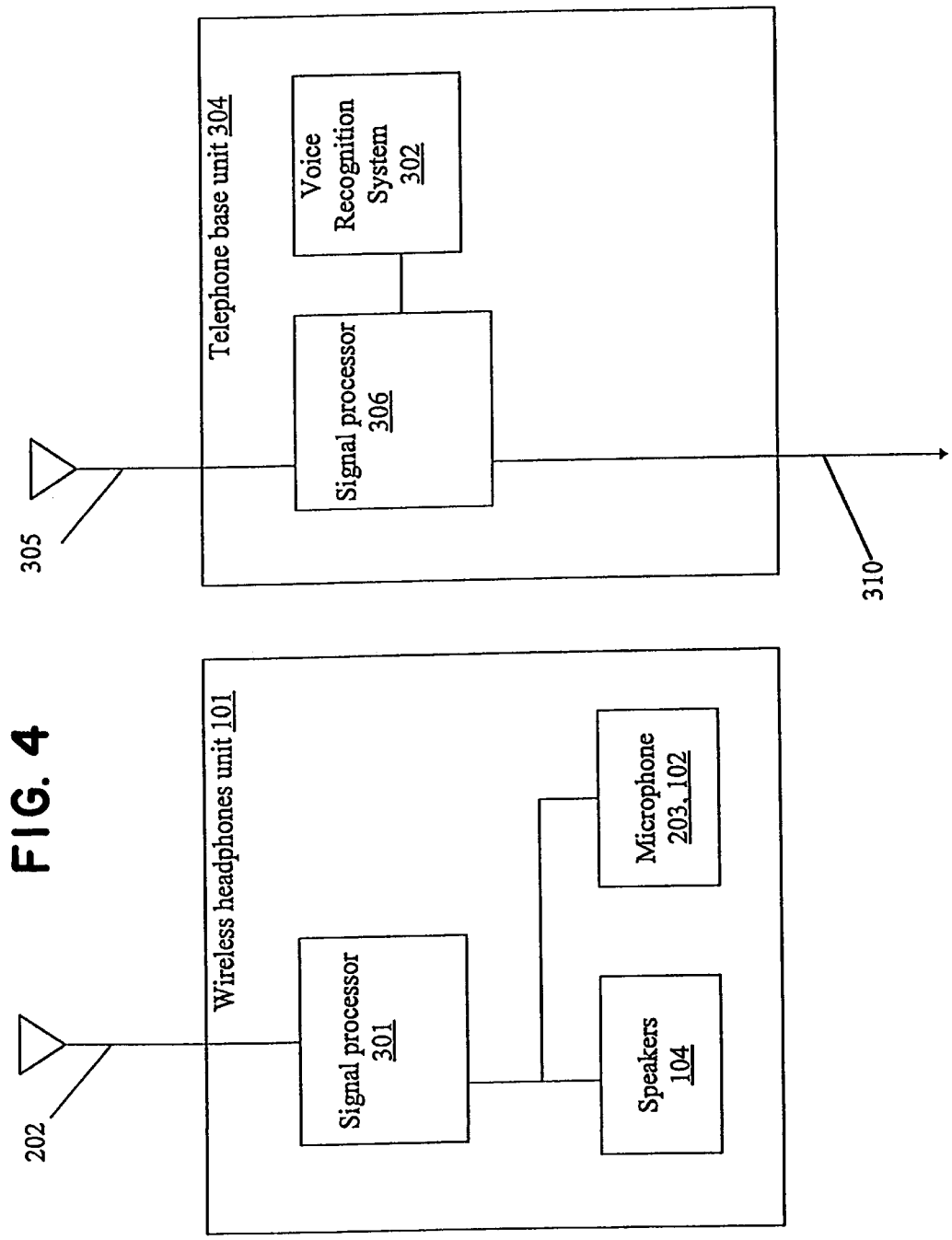
FIG. 4 is a block diagram for explaining a fourth embodiment of the present invention.

The wireless headphones 101 of the present invention may also receive transmissions from and send transmissions to a telephone base unit 304 (See FIGS. 3 and 4). This telephone base 304 unit is connected to a standard public phone line 310 and may be the base unit for a cordless phone with a handset or may be dedicated solely for use with the headphones 101.

In the event the user is listening to music or other audio programming being transmitted to the headphones 101 and a telephone call is received, the signal processor 306 of the telephone base unit 304 will transmit a signal to the headphones 101 with antenna 305. Upon receipt of that signal, the headphones 101 alert the user to the incoming call. This may be done in a number of ways, all of which are considered equivalent for purposes of the present invention.

For example, the headphones 101 may suspend the music or other audio programming and instead, with speakers 104, sound an audio alert that a telephone call is incoming. Alternatively, the headphones 101 may superimpose the audio alert of an incoming phone call on the audio programming being played, with or without decreasing the volume of the programming. Additionally, the headphones 101 may simply mute the music or audio programming to which the user is listening so that the user may hear the regular ringing of a telephone unit nearby.

For the convenience of the user, the wireless telephone unit 101 of the present invention allows the user to answer the incoming telephone call with the wireless telephone unit 101. To do this a microphone is incorporated on the headphones 101. This microphone may be a microphone 203 located on, for example, a speaker housing 104 of the headphones 101. Preferably, a microphone 102 may be disposed on an extension 105 which can be pulled from and then retracted into, for example, a speaker housing 104. Alternatively, the headphones 101 may simply incorporate a microphone on a non-retractable extension (not shown). The non-retractable extension may be rotatably attached to the headphones so it can be rotated away from the face of the user when not needed. One or more of these options may be incorporated in an embodiment of the present invention.

When an incoming telephone call is received, and the user is notified and wishes to take the call, the microphone 203 or 102 is activated by the user. A button 201 may be provided on the headphones 101 for activating the microphone 201 or 102. Additionally or alternatively, the microphone 102 and extension 105 may incorporate a switch such that the microphone 102 is automatically activated when the extension 105 is extended from the speaker casing 104 and deactivated when retracted.

With the microphone 203 or 102 active, the user may conduct the telephone call by listening to the other party through the speakers 104 and verbally responding to the other party through the microphone 201 or 102. The signal processor 301 of headphones 101 (See FIGS. 3 and 4) transmits the necessary signals to and from the phone base unit 304 using the antenna 202 in, for example, the same manner as a cordless telephone handset.

Additionally, if no call is incoming and the user activates the microphone 203 or 102 by pushing the button 201 or extending the extension 105, the telephone base unit 304 may initiate a phone call and provide a dial tone to the speakers 104. To initiate a call, the system is preferably provided with a voice recognition unit 302. As shown in FIG. 3, the voice recognition system 302 may be incorporated into the headphones unit 101. Alternatively, the voice recognition system 302 may be located in the telephone base unit 204 as shown in FIG. 4.

With the voice recognition system 204, wherever located, the user may speak a command such as "Call Mom." The command is understood by the voice recognition unit which is programmed with the phone number of the party indicated. Under the direction of the voice recognition system 302, the telephone base unit then dials the indicated party. Alternatively, a numeric keypad may be provided on the headphones with which the user can dial a party to be called.

A switch 204 may be added to the headphones 101 of the present invention. Switch 204 can be used for disabling the reception of incoming telephone calls in the event the user does not wish to be disturbed.

Figure 2:
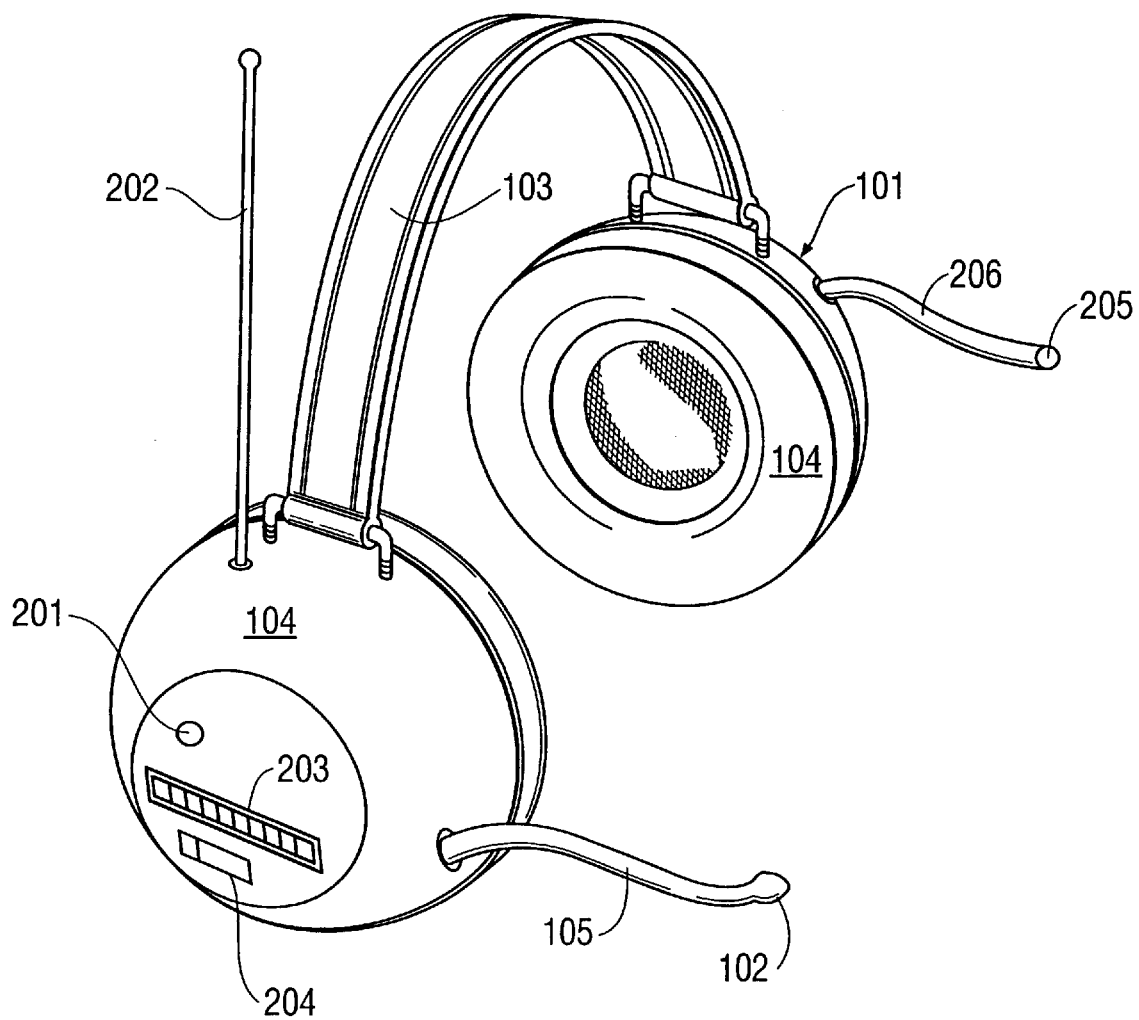
FIG. 2 is an illustration of a second embodiment of the present invention adding additional features to the embodiment pictured in FIG. 1.

A second embodiment of the present invention is illustrated in FIG. 2. This embodiment is identical to that described in FIG. 1 with the addition of a light source 205. Like reference numerals indicate like elements.

In the embodiment of FIG. 2, a light source 205 may be provided on the headphones unit 101. This light source 205 may be, for example, a light bulb or the terminal end of a fiber optic cable conducting light from a light source located elsewhere. The light source 205 is preferably disposed on an extension 206 which may be extended and retracted from the speaker casing 104. Suitable means for activating and deactivating the light source 205 may be provided similar to the means described above for activating and deactivating the microphone 201 or 102.

With the addition of the light source 205, the user may, for example, read or perform other tasks in low ambient light, as well as listen to audio programming and monitor incoming telephone calls. This may be extremely useful if the user happens or needs to be in circumstances where noise or bright light will disturb others nearby, for example, if the user is in a room where someone is sleeping.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. An apparatus for providing portable audio programming for the listening enjoyment of a user while preventing the user from missing telephone calls comprising:

headphones; and a circuit on said headphones which receives radio frequency wireless transmissions from both a phone base unit and an audio system;

wherein said circuit alerts a user of said headphones when a transmission received from the phone base unit indicates an incoming phone call; and wherein said circuit further comprises a switch for disabling said circuit from alerting the user of a transmission received from the phone base unit indicating an incoming phone call.

2. The apparatus of claim 1, further comprising a microphone on said headphones, wherein said circuit transduces verbal utterances of the user with said microphone and transmits said utterances to the phone base unit to conduct a telephone call.

3. The apparatus of claim 2, further comprising a switch for activating and deactivating said microphone.

4. An apparatus for providing portable audio programming for the listening enjoyment of a user while preventing the user from missing telephone calls comprising:

headphones;

a circuit on said headphones which receives radio frequency wireless transmissions from both a phone base unit and an audio system, wherein said circuit alerts a user of said headphones when a transmission received from the phone base unit indicates an incoming phone call; and a microphone on said headphones, wherein said circuit transduces verbal utterances of the user with said microphone and transmits said utterances to the phone base unit to conduct a telephone call; and wherein said microphone is disposed on an extension which can be extended from and retracted into said headphones.

5. The apparatus of claim 4, further comprising a switch which automatically activates said microphone upon extending of said extension and automatically deactivates said microphone upon retraction of said extension.

6. The apparatus of claim 3, wherein if said switch is actuated to activate said microphone following said alert, said circuit opens a line through the telephone base unit over which the incoming telephone call is conducted.

7. The apparatus of claim 3, wherein if said switch is actuated to activate said microphone without said circuit having received an indication of an incoming telephone call, said circuit will open a line through the telephone base unit for initiating a telephone call.

8. The apparatus of claim 7, wherein said circuit comprises a voice recognition system which recognizes the name of a party to be called uttered by the user and initiates a telephone call over said open line to said party.

9. The apparatus of claim 8, wherein said telephone base unit comprises a voice recognition system which recognizes the name of party to be called uttered by the user and initiates a telephone call over said open line to said party.

10. The apparatus of claim 1, further comprising a visible light source disposed on said headphones.

11. A method for providing portable audio programming for the listening enjoyment of a user while preventing the user from missing telephone calls comprising:

providing headphones;

providing a circuit with said headphones which receives radio frequency wireless transmissions from both a phone base unit and an audio system;

with said circuit, alerting a user of said headphones when a transmission received from the phone base unit indicates an incoming phone call; and disabling said circuit from alerting the user of a transmission received from the phone base unit indicating an incoming phone call with a switch provided with said headphones.

12. The method of claim 11, further comprising:

transducing verbal utterances of the user with a microphone provided with said headphones; and transmitting said utterances to the phone base unit to conduct a telephone call.

13. The method of claim 12, further comprising activating and deactivating said microphone with a switch.

14. A method for providing portable audio programming for the listening enjoyment of a user while preventing the user from missing telephone calls comprising:

providing headphones;

providing a circuit with said headphones which receives radio frequency wireless transmissions from both a phone base unit and an audio system;

with said circuit, alerting a user of said headphones when a transmission received from the phone base unit indicates an incoming phone call;

transducing verbal utterances of the user with a microphone provided with said headphones;

transmitting said utterances to the phone base unit to conduct a telephone call; and providing said microphone on an extension which can be extended from and retracted into said headphones.

15. The method of claim 14, further comprising automatically activating said microphone upon extending of said extension and automatically deactivating said microphone upon retraction of said extension.

16. The method of claim 13, wherein, if said switch is actuated to activate said microphone following said alert, said method further comprises:

opening a line through the telephone base unit, with said circuit to receive an incoming call; and answering the incoming telephone call over said opened line.

17. The method of claim 13, wherein, if said switch is actuated to activate said microphone without said circuit having received an indication of an incoming telephone call, said method further comprises opening a line through the telephone base unit with said circuit for initiating a telephone call.

18. The method of claim 17, further comprising:

recognizing the name of party to be called uttered by the user with a voice recognition system provided as part of said circuit; and initiating a telephone call over said open line to said party.

19. The method of claim 17, further comprising:

recognizing the name of party to be called uttered by the user with a voice recognition system provided at said telephone base unit; and initiating a telephone call over said open line to said party.

20. The method of claim 11, further comprising providing a visible light source on said headphones for illuminating an area in front of a wearer of said headphones.

21. An apparatus for providing portable audio programming for the listening enjoyment of a user while preventing the user from missing telephone calls comprising:

headphones; and a circuit on said headphones which receives radio frequency wireless transmissions from both a phone base unit and an audio system;

wherein said circuit alerts a user of said headphones when a transmission received from the phone base unit indicates an incoming phone call; and wherein said circuit decreases a volume of said audio programming being played on said headphones in response to reception of said incoming phone call and operation of said circuit to alert said user of said incoming phone call.

22. An apparatus for providing portable audio programming for the listening enjoyment of a user while preventing the user from missing telephone calls comprising:

headphones; and a circuit on said headphones which receives radio frequency wireless transmissions from both a phone base unit and an audio system;

wherein said circuit alerts a user of said headphones when a transmission received from the phone base unit indicates an incoming phone call; and wherein said circuit suspends said audio programming in response to reception of said incoming phone call and operation of said circuit to alert said user of said incoming phone call.

23. A method for providing portable audio programming for the listening enjoyment of a user while preventing the user from missing telephone calls comprising:

providing headphones;

providing a circuit with said headphones which receives radio frequency wireless transmissions from both a phone base unit and an audio system;

with said circuit, alerting a user of said headphones when a transmission received from the phone base unit indicates an incoming phone call; and decreasing a volume of said audio programming being played on said headphones in response to reception of said incoming phone call and in coincidence with said alerting a user of said headphones to said incoming phone call.

24. A method for providing portable audio programming for the listening enjoyment of a user while preventing the user from missing telephone calls comprising:

providing headphones;

providing a circuit with said headphones which receives radio frequency wireless transmissions from both a phone base unit and an audio system;

with said circuit, alerting a user of said headphones when a transmission received from the phone base unit indicates an incoming phone call; and suspending said audio programming in response to reception of said incoming phone call and in coincidence with said alerting a user of said headphones to said incoming phone call.

* * * * *